(12) United States Patent
Burton

(10) Patent No.: US 6,247,868 B1
(45) Date of Patent: Jun. 19, 2001

(54) BALL SOCKET FOR PIVOT JOINT

(76) Inventor: John E. Burton, 707 W. Court St., Ludington, MI (US) 49131

( * ) Notice: Subject to any disclaimer, the term of this patent is extended or adjusted under 35 U.S.C. 154(b) by 0 days.

(21) Appl. No.: 09/271,001

(22) Filed: Mar. 17, 1999

Related U.S. Application Data (63) Continuation-in-part of application No. 09/023,276, filed on Feb. 13, 1998, now Pat. No. 6,113,301.

(51) Int. Cl.⁷ .............................. F16C 11/05; F21V 3/00
(52) U.S. Cl. ..................... 403/135; 403/122; 362/528; 362/421
(58) Field of Search ................................ 403/122, 133, 403/132, 135, 137, 141, 138; 362/528, 515, 421

(56) References Cited

U.S. PATENT DOCUMENTS

| | | |
|---|---|---|
| 3,396,554 | 8/1968 | Westercamp . |
| 3,564,984 | 2/1971 | Alexander . |
| 4,084,913 | 4/1978 | Schenk . |
| 4,111,570 | 9/1978 | Morel . |
| 4,200,405 | 4/1980 | Bauer . |
| 4,465,393 | 8/1984 | Dieckmann . |
| 4,574,334 | 3/1986 | Igura . |
| 4,607,976 | 8/1986 | Peek et al. . |
| 4,689,725 | 8/1987 | Saijo et al. . |
| 4,703,399 | 10/1987 | Van Duyn et al. . |
| 4,707,769 | 11/1987 | Van Duyn . |
| 4,707,770 | 11/1987 | Van Duyn . |
| 4,707,771 | 11/1987 | Van Duyn et al. . |
| 4,709,306 | 11/1987 | Harris et al. . |
| 4,839,785 | 6/1989 | Ohishi . |
| 4,845,598 | 7/1989 | Watanabe et al. . |
| 4,849,860 | 7/1989 | Schauwecker . |
| 4,882,658 | 11/1989 | Allen . |
| 4,974,123 | 11/1990 | Luallin et al. . |
| 5,011,322 | 4/1991 | Schauwecker . |
| 5,034,870 | 7/1991 | Weber . |
| 5,045,987 | 9/1991 | Herbert . |
| 5,047,904 | 9/1991 | Vraux . |
| 5,063,481 | 11/1991 | Martin . |
| 5,095,411 | 3/1992 | Peck et al. . |
| 5,153,976 | 10/1992 | Benchaar et al. . |
| 5,161,877 | 11/1992 | Wright et al. . |
| 5,186,531 | 2/1993 | Ryder et al. . |
| 5,186,532 | 2/1993 | Ryder et al. . |

(List continued on next page.)

*Primary Examiner*—Lynne H. Browne
*Assistant Examiner*—John R. Cottingham
(74) *Attorney, Agent, or Firm*—Brian G. Gilpin; Godfrey & Kahn, S.C.

(57) ABSTRACT

A disengageable pivot connection includes a ball stud that is capable of being selectively removed from the corresponding socket. The ball stud includes an engagement head that has substantially flat faces or grooves that correspond to tabs extending from the rim of the socket into which the ball stud is engaged. To install, the ball stud is inserted into the socket such that the substantially flat faces or grooves on the head pass by the tabs extending from the rim of the socket. Then, the ball stud is rotated such that the head engages the tabs extending from the rim of the socket. Alternatively, the head of the ball stud is snap-fitted into the socket as is conventional in the art. As such, the head cannot be removed from the socket without additional rotation. The head remains free to pivot within the socket as required for the particular application. One particularly desirable application of the present invention is in automotive lamp assemblies. An improved one-piece ball socket may be used in connection with the disengageable ball stud or may be used with a conventional ball stud. The socket includes a centrally located mounting hole and an undercut which forms a chamber for trapping the head of a mounting screw to facilitate assembly to the reflector.

20 Claims, 11 Drawing Sheets

U.S. PATENT DOCUMENTS

| | | | |
|---|---|---|---|
| 5,188,477 | * 2/1993 | Idosako et al. | 403/138 X |
| 5,249,334 | * 10/1993 | Horberg et al. | 403/132 X |
| 5,258,894 | 11/1993 | Bivens . | |
| 5,270,907 | 12/1993 | Lisak . | |
| 5,360,282 | 11/1994 | Nagengast et al. . | |
| 5,365,415 | 11/1994 | Schmitt et al. . | |
| 5,381,317 | 1/1995 | Schmitt et al. . | |
| 5,428,511 | * 6/1995 | Luallin et al. | 362/528 X |
| 5,483,425 | 1/1996 | Luallin et al. . | |
| 5,508,896 | 4/1996 | Suehiro et al. . | |
| 5,546,283 | 8/1996 | Ohtsuka et al. . | |
| 5,577,836 | 11/1996 | Vent et al. . | |
| 5,642,935 | 7/1997 | Schmitt . | |
| 5,653,548 | 8/1997 | Amdahl . | |
| 5,673,992 | 10/1997 | Schmitt . | |
| 5,678,915 | 10/1997 | Shirai et al. . | |
| 5,704,726 | * 1/1998 | Nemoto | 403/132 X |
| 5,707,133 | 1/1998 | Burton . | |
| 5,741,059 | 4/1998 | Kusagaya . | |
| 5,743,618 | 4/1998 | Fujino et al. . | |
| 5,746,559 | 5/1998 | Shirai . | |
| 5,833,347 | 11/1998 | Nakamura et al. . | |
| 5,915,831 | 6/1999 | Bonin et al. . | |

\* cited by examiner

FIG_1 PRIOR ART

FIG_2B PRIOR ART

FIG_2A PRIOR ART

FIG_7

FIG_8

FIG_9

FIG_10

FIG_11

FIG_12

FIG_13  FIG_14

FIG_15  FIG_16

FIG_17

BALL SOCKET FOR PIVOT JOINT

CROSS-REFERENCE TO RELATED APPLICATION

This application is a continuation-in-part of U.S. patent application Ser. No. 09/023,276 filed Feb. 13, 1998 now U.S. Pat. No. 6,113,301 issued Sept. 5, 2000.

BACKGROUND OF THE INVENTION

This invention relates generally to pivot joints, and in particular to a disengageable pivot joint particularly useful for connecting a headlamp adjuster to the reflector inside a headlamp assembly. It also can be used as a compact disengageable connector that allows pivotable movement within the attachment. The improved ball socket, while particularly useful in connection with a disengageable ball stud such as the ones described herein, can also be effectively used in connection with conventional ball studs.

Figure 17:
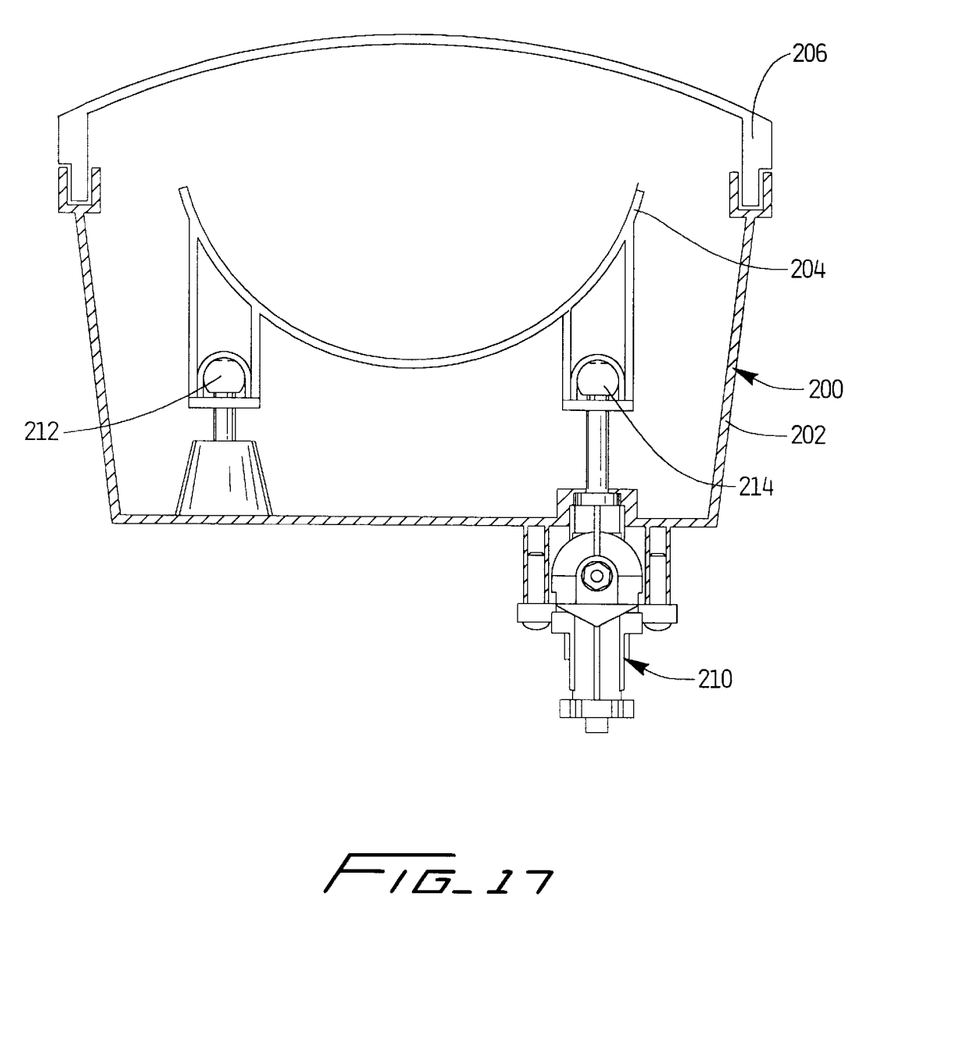
FIG. 17 is a partial cross-section of an automotive lamp assembly.
Figure 18:
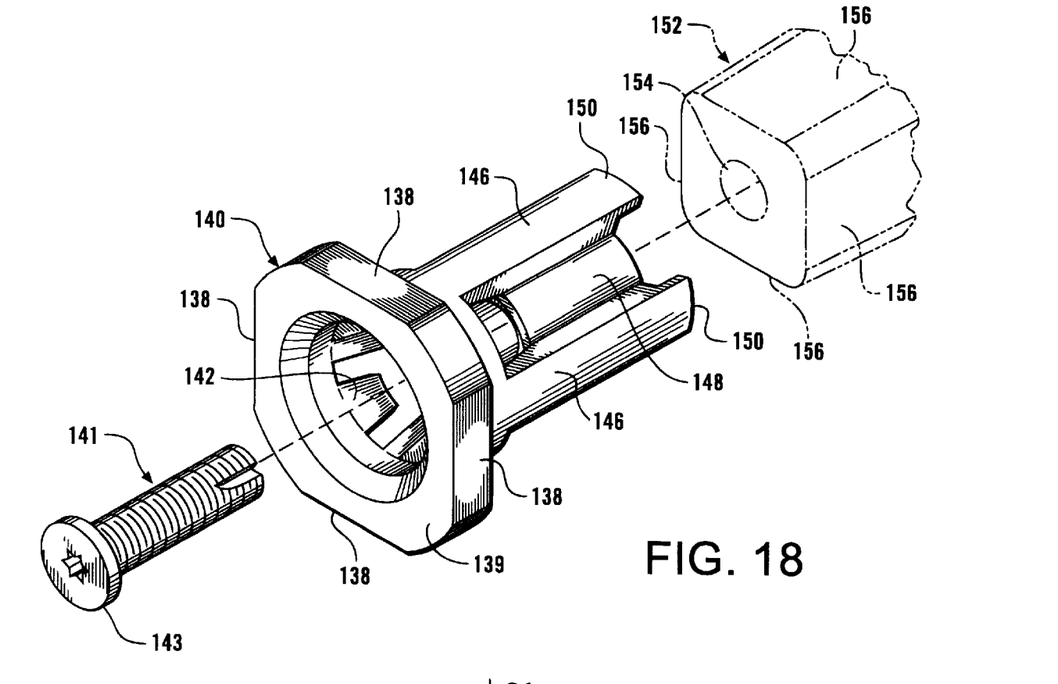
FIG. 18 is an exploded perspective view of a socket constructed in accordance with one embodiment of the improved socket invention.
Figure 19:
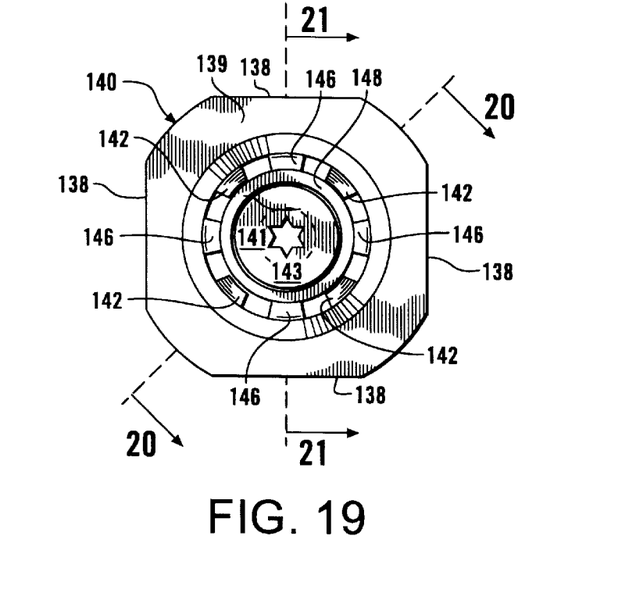
FIG. 19 is a top end view of the socket in FIG. 18 with the mounting screw secured therein.
Figure 20:
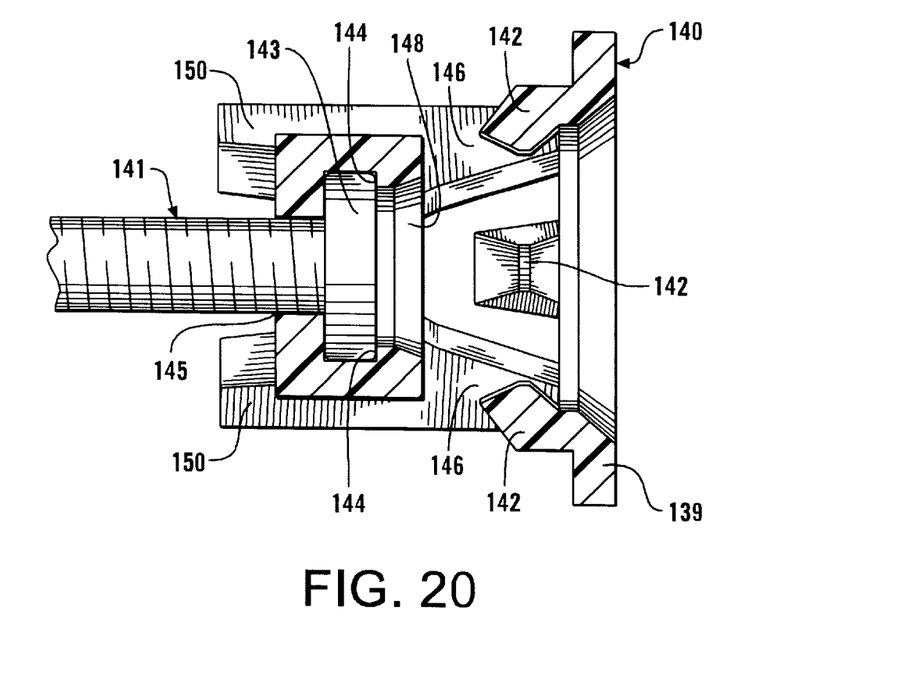
FIG. 20 is a partial cross-section of the socket in FIG. 19, taken generally along the line 20—20 in FIG. 19, the mounting screw not shown in cross-section.
Figure 21:
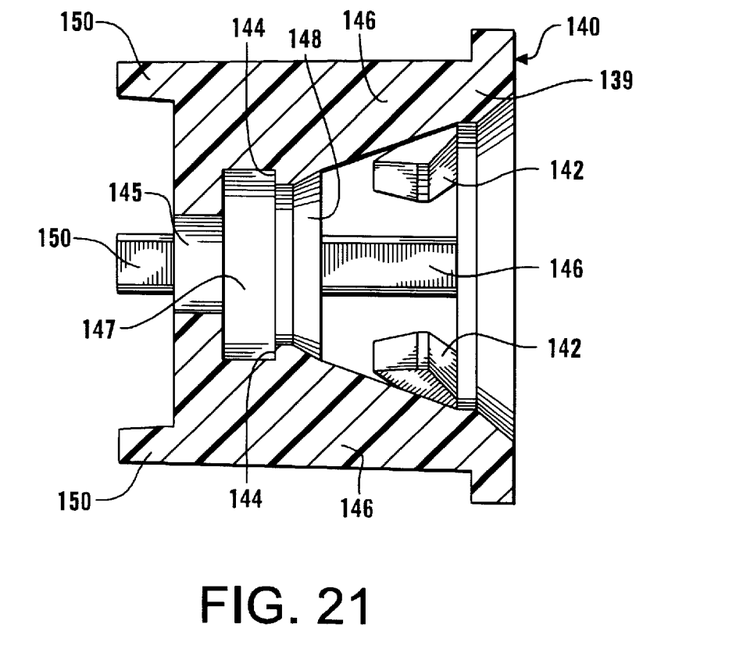
FIG. 21 is a cross-section of the socket in FIG. 19, taken generally along the line 21—21 in FIG. 20, with the mounting screw not shown.
Figure 22:
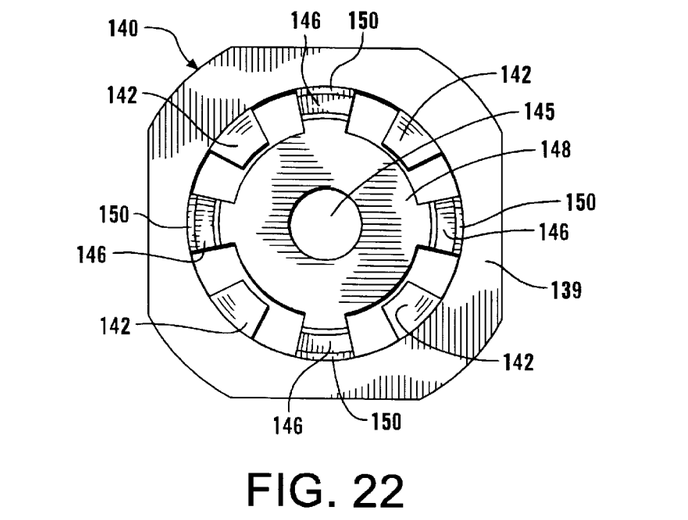
FIG. 22 is a bottom end view of the socket of FIG. 18 with the mounting screw not shown.

Pivotable spherical joints, commonly referred to as ball joints, include a ball stud engaged in a socket. Such joints have a wide variety of applications where a pivotable connection between two parts is desirable. For example, they may be used in many types of linear actuators and have been found to be particularly useful in automotive lamp assemblies. As shown in FIG. 17, similar to FIG. 2 of U.S. Pat. No. 5,707,133 incorporated herein by reference, automotive lamp assemblies 200 used as headlights typically comprise several basic parts: a support frame 202, a reflector 204, a lens 206, a bulb (not shown), and one or more adjusters 210. The support frame 202 houses the reflector 204 and the bulb on a pivotable mounting to allow the aim of the light to be adjusted using the adjuster 210. The lens 206 seals the front of the assembly 200 to protect it from the elements assailing the front end of the vehicle and provides an aerodynamic shape and attractive appearance. In such an automotive lamp assembly 200, the reflector 204 mounts inside the housing on one fixed ball joint 212 and is adjustable horizontally and vertically using adjusters 210 that interface with the reflector 204 through moving ball joints 214. The moving ball joints 214 are moveable by actuating the adjusters 210 connected to the moving ball joints 214 by a ball stud having a head and a shaft. Ball joints are required because of the many possible adjustments that may be made to the orientation of the reflector 204. If ball joints are not used, the reflector 204 into which the adjusters 210 are fitted will not be properly adjustable because the reflector 204 will not be positionable in both the vertical and horizontal directions. Right angle adjusters are typically used to allow the adjustment of the headlight from an adjusting position above the installed headlight. In other applications, a motorized adjuster, a straight adjuster, or another type of adjuster is used.

Figure 24:
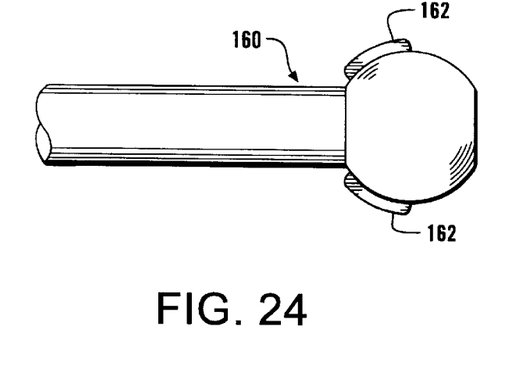
FIG. 24 is a side elevation view of a conventional "eared" ball stud.
Figure 24A:
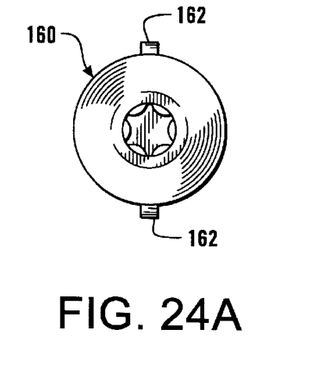
FIG. 24A is a front end view of the conventional "eared" ball stud of FIG. 24.

In some adjusters, the ball stud rotates upon actuation of the adjuster unless it is prevented from doing so by engaging tabs ("ears") or similar structure on the ball stud. Such adjusters are not readily adaptable for use with the present disengageable ball stud invention but may be used in connection with an embodiment of the improved ball socket invention. Examples of such adjusters are disclosed in U.S. Pat. Nos. 4,689,725, 5,161,877 and 5,186,531 and an example of an "eared" ball stud is shown in FIGS. 24 and 24A. Adjusters for use with the present disengageable ball stud invention should have a means for preventing rotation of the ball stud, head, and shaft included in the adjuster. For example, the adjuster disclosed in U.S. Pat. No. 5,707,133, incorporated herein by reference, is ideally suited for use with the present invention as it uses an anti-rotation insert that engages grooves on the shaft to prevent rotation of the ball stud. While one possible application of the present invention is in headlamp assemblies, other applications are possible and references to use in a headlamp assembly should not be deemed to limit the possible uses of the present invention. Additionally, while the improved ball socket design described herein is ideally suited for use with a disengageable ball stud, such as the ones described herein, it can also be used advantageously with conventional ball studs including those with "ears" or engaging tabs.

Figures 1, 2A, 2B:
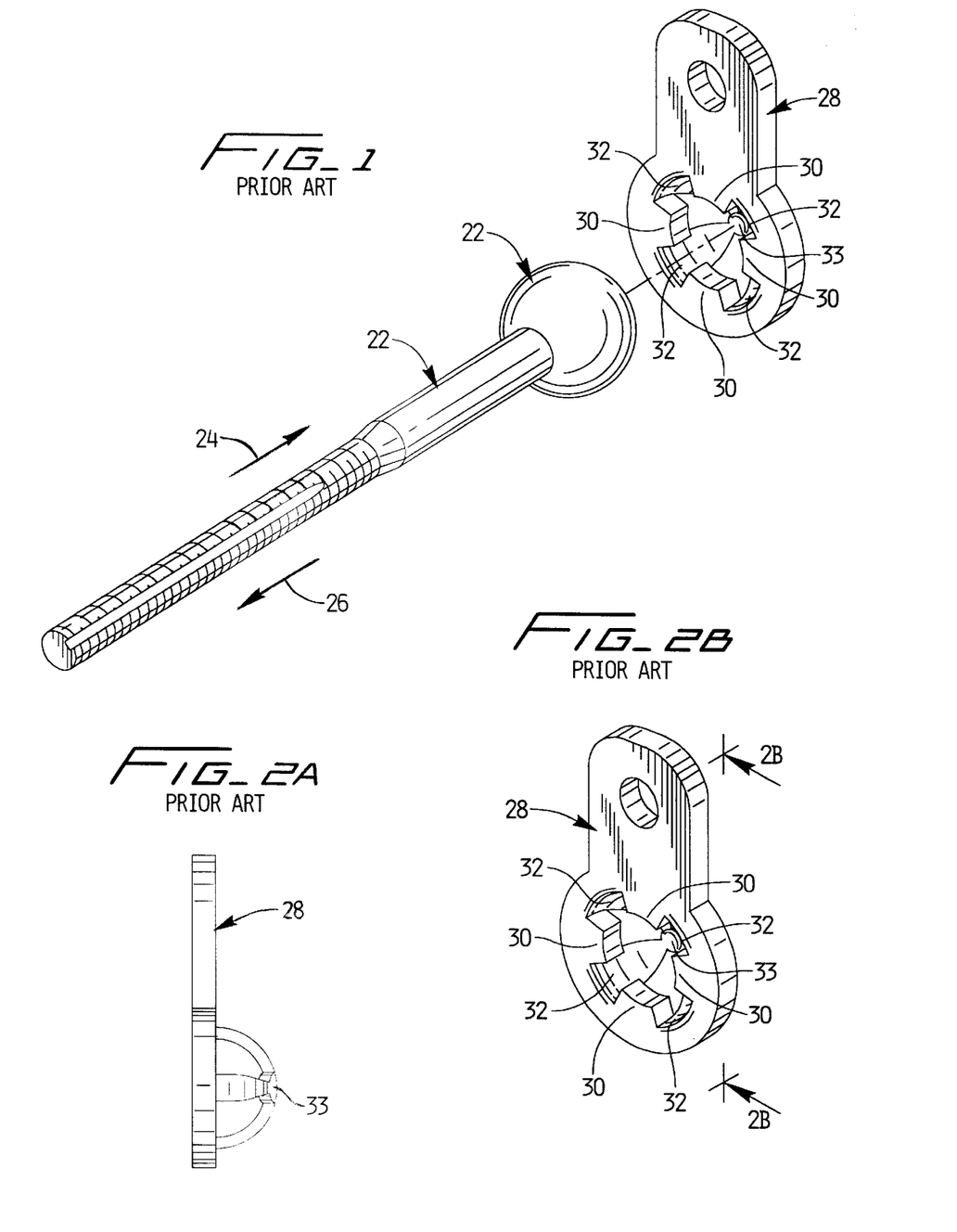
FIG. 1 is an exploded perspective view of a conventional ball stud and corresponding conventional "peanut style" socket.
FIG. 2A is a perspective view of a conventional "peanut style" socket.
FIG. 2B is a side elevation view of a conventional "peanut style" socket viewed generally from the direction indicated by 2B—2B in FIG. 2A.

As shown in FIGS. 1, 2A, and 2B, conventional ball joints for use in automotive lamp assemblies typically include a ball stud 20 with a spherical engagement head 22 extending from an adjuster, the ball stud 20 is capable of being moved linearly in and out of the adjuster (arrows 24 and 26). Such conventional ball studs 20 typically interface with a plastic socket 28 attached to the reflector such that movement of the ball stud effectuates movement of the reflector. The interface between the ball stud 20 and the socket 28 is such that the head 22 of the ball stud 20 cannot be readily removed from the socket 28 once the head 22 is secured therein. This is because of fingers or tabs 30 protruding from the opening of the socket 28 that retain the head 22 in the socket 28. The fingers or tabs 30 have relief areas 32 interposed therebetween. Retention in the socket is desired because the bead 22 cannot be allowed to slip from the socket 28 once the adjuster is installed or the adjuster will not be able to adjust of the orientation of the reflector. When engaged in the socket 28, the head 22 of the ball stud 20 is free to pivot within the cup portion 33 of the socket 28.

Additional examples of prior art ball stud and corresponding sockets are shown in FIGS. 4 and 5 of U.S. Pat. No. 4,689,725, FIG. 2 of U.S. Pat. No. 5,161,877, FIG. 1 of U.S. Pat. No. 5,673,992, FIG. 2 of U.S. Pat. No. 5,095, 411, and FIGS. 10–14 of U.S. Pat. No. 5,186,532. Additionally, several U.S. patents are directed toward ball joints for use in headlamp adjusting mechanisms: U.S. Pat. Nos. 4,974,123, 5,047,904, and 5,063,481.

While functionally quite effective, there is a major drawback to using conventional ball joints and sockets in modern sealed automotive lamp assemblies. The relatively permanent installation of conventional ball stud heads into sockets does not allow removal of the ball stud should the lamp assembly or adjuster need to be replaced. In conventional assemblies, if the lamp assembly or the adjuster is found to be defective, the entire assembly, including the adjuster, is usually discarded or completely disassembled and reworked. Discarding an entire assembly or an entire adjuster can be quite expensive and it is desirable to salvage the properly working parts, especially in cases where the adjuster is an expensive motorized version.

Typically, a "peanut style" socket, such as the one shown in FIGS. 1, 2A, and 2B, is used in connection with ball studs in headlamp adjusters. While somewhat effective, and capable of being used with either the disengageable ball stud described herein or a conventional ball stud, there are several drawbacks to using a "peanut style" ball socket. For example, such sockets require multiple parts on the assembly line—the plastic socket piece and the screw. This requires multiple part numbers and an additional step (matching the screw to the socket piece) in the assembly process. Additionally, in such sockets, the point of attachment to the reflector—the screw—is relatively distant from the socket—the place where the stress is imparted on the pieces. This allows deflection of the piece between the attachment and the socket which may result in inconsistent aiming performance. Furthermore, such sockets require a relatively large boss on the reflector in order the properly attach the socket and mount the ball stud thereon.

Accordingly, a need exists for a ball joint that is easily assembled, wherein the head of the ball stud is removable if desired but retains its engagement in the socket as required, maintains its pivotability, cannot be removed from the socket unless desired, and is cost-effective. Additionally, the need exists for an improved ball socket that is easily installed in the lamp, securely retains a ball stud placed therein, can be effectively used in connection with disengageable or conventional ball studs, and is cost effective. The present invention relates to an improved ball joint which is capable of being used in automotive lamp assemblies and solves the problems raised or not solved by existing ball joints. Of course, the present invention may be used in a multitude of non-automotive lamp situations where similar performance capabilities are required.

SUMMARY OF THE INVENTION

It is therefore an object of the present invention to provide a ball stud with a head that is removable from the corresponding socket if desired but retains its engagement in the socket as required. It is another object of the present invention to provide a ball stud head and corresponding socket that can provide means for accomplishing the desired adjustment when installed in a lamp assembly. It is an additional object of the present invention to provide a ball stud head and corresponding socket that is cost-effective. Additionally, it is an object of the improved ball socket embodiment of the invention to provide a ball socket that is easily installed in the lamp, securely retains a ball stud placed therein, can be effectively used in connection with disengageable or conventional ball studs, and is cost effective.

The ball stud and corresponding socket of the present invention provides the above identified and many additional objects by providing a ball stud with an engagement head that can be selectively removed from the corresponding socket as desired, is easily installed, and is cost-effective. As described in more detail below and shown in the accompanying drawings, the head of the ball stud of the present invention includes flats or surfaces such that the thickness of the head at the flat portion is less than the thickness at the rounded portion. While using four flats has been found to be effective, other numbers may be used. Additionally, recessed surfaces or grooves may be used instead of flats. The corresponding socket into which the ball stud head is engaged has fingers or tabs extending into the opening of the socket that correspond to the flats on the head. The flats on the head can pass by the tabs on the socket in order to insert or remove the engagement head from the socket. When the ball stud is rotated such that the flats on the engagement head are no longer oriented toward the tabs, the rounded portion of the head engages the tabs. When the corresponding surfaces are thus engaged, the ball stud cannot be removed from the socket without further rotation within the socket. As such, the ball stud remains free to pivot within the cup portion of the socket but cannot be removed from the socket without rotation of the head.

The improved ball socket can be effectively used with conventional or disengageable ball studs, is easily installed in a lamp assembly, and is cost effective. The improved ball socket is a one-piece design that includes the mounting screw retained therewithin for ease of installation to the reflector and for reduced parts count. The socket has tabs capable of retaining the ball stud once inserted that extend into the opening of the socket. The tabs function with a disengageable ball stud and the socket may also be used with conventional ball studs. Furthermore, in one embodiment, the socket may be used with "eared" ball studs to prevent rotation of the ball stud. The socket retains the mounting screw therein by providing an undercut portion which secures the retaining screw after it is snap-fitted into the socket. The socket further includes leg extensions to allow the socket to non-rotatably mount on a square-ended boss. This non-rotatable mounting allows the socket to be effectively used with the disengageable ball stud because it ensures the proper orientation of the tabs and also allows the socket to be effectively used with a conventional ball stud with "ears" because it ensures proper orientation of the ear slots. The ability to use the socket with a wide variety of ball studs provides a significant benefit to headlamp assemblers because it allows the use of one style of socket with a number of types of ball stud. Additionally, on the assembly line the use of an integral socket/mounting screw piece facilitates automated assembly and reduces part handling since the screw is incorporated into the ball socket. Finally, the in-line attachment of the socket to the boss reduces deflection of the part and results in more consistent aiming performance.

Installing the improved ball socket of the present invention to the reflector is quite simple. The socket, with the mounting screw disposed therein, is aligned such that the mounting screw is properly oriented toward the hole in the boss extending from the reflector. The mounting screw is then screwed into the hole to mount the socket to the boss. When used in conjunction with a disengageable ball stud or with a ball stud with "ears," the boss is generally square in shape in the region of the leg extentions and the leg extensions engage the flat sides of the square boss to prevent the socket from rotating once it is secured to the boss. Because the mounting screw is allowed to rotate inside the socket, the socket can be held fixed by the flats that are incorporated into the face plate of the socket. This allows the leg extensions to be oriented to the square boss while the screw is being screwed into the hole.

Installing the disengageable ball stud of the present invention into a corresponding socket, whether the conventional "peanut style" socket, the improved socket described herein, or another type of socket, is quite simple. The shaft of the adjuster is aligned with the socket in the reflector such that the flats on the engagement head of the ball stud are oriented toward the tabs on the socket and the head is inserted into the socket. Then, the adjusting shaft is rotated to engage the rounded portions of the head with the tabs of the socket. After such engagement is accomplished, the shaft can be moved by the adjuster in an axial direction to effectuate adjustment of the reflector. Alternatively, the engagement head of the ball stud may be snap-fitted into the socket by forcing the rounded portions of the head past the tabs of the socket as is conventional in the art. Options made available by the ability to secure the ball stud in the socket by rotation (and not snapping) include designing the tabs of the ball socket with increased thickness to achieve a higher strength connection or using socket materials not well suited for a snap-fitting. If removal of the adjuster from the lamp assembly is desired, the engagement head is easily disengageable from the socket by rotation of the ball stud such that the tabs no longer engage the round portions of the head and the head can freely pass from the socket.

Another application for the present invention is a compact disengageable connector. With a detent or other means to hold the ball and socket in the engaged position, an easy to use connector is created with a pivotal range of motion. One means of designing a detent is to form the tabs to bias the rounded portion of the ball in the engaged position. To remove the ball stud from the socket, one simply rotates the ball to the released position, overcoming the bias of the detent, then removes the ball stud. Re-insertion and engagement is achieved by reversing the process.

While one possible application of the present invention is in headlamp assemblies, many other applications are possible and references to use in a headlamp assembly should not be deemed to limit the uses of the present invention. The terms "ball stud," "engagement head," or "head" as used herein should not be interpreted as being limited to spherical or semispherical shapes, rather, as explained in more detail below, the engagement heads of ball studs in accordance with the present invention may have a wide variety of shapes and may include protrusions having semispherical or otherwise pivotably-shaped tips. The tabs used in the socket can be a wide variety of shapes capable of selectively retaining the ball stud in the socket. The tabs may have detents or other biasing means to bias the ball stud in the retained position. These and other objects and advantages of the present invention will become apparent from the detailed description, claims, and accompanying drawings.

DETAILED DESCRIPTION OF THE PREFERRED EMBODIMENTS

Figures 3, 4:
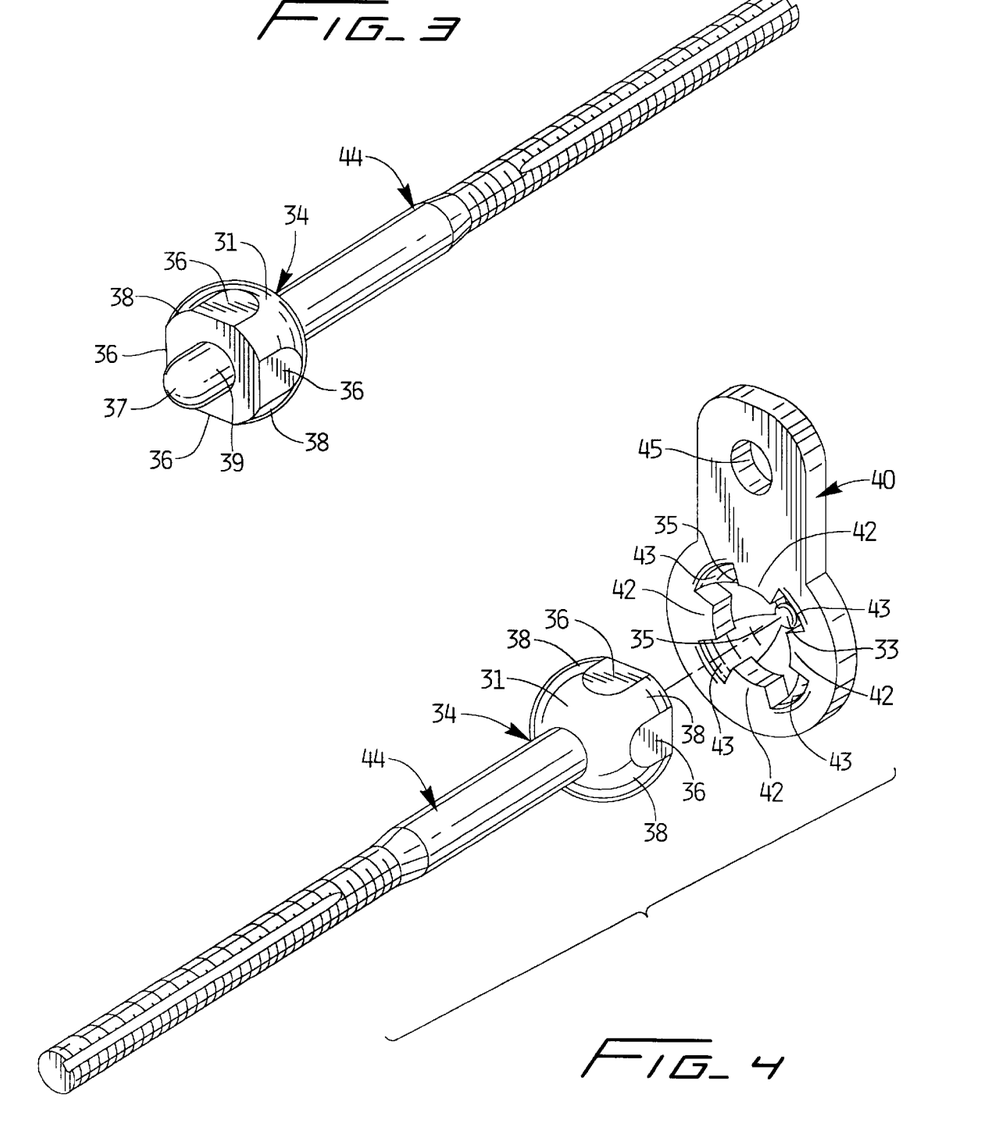
FIG. 3 is a perspective view of a ball stud constructed in accordance with a preferred embodiment of the present invention.
FIG. 4 is an exploded perspective view of the ball stud of FIG. 3 and the conventional socket of FIGS. 2A and 2B oriented such that the flats of the ball stud can pass by the tabs on the socket.

FIG. 3 is a perspective view of a ball stud (identified generally as 34) with a partially threaded shaft 44 and a pivotable engagement head 31 in accordance with the present invention. The head 31 of the ball stud 34 includes a plurality of flats or surfaces 36 such that the thickness of the head 31 at the flat portion 36 is less than the thickness at the rounded portion 38. As shown in FIG. 4, the corresponding socket 40 into which the head 31 is engageable may be identical to the conventional socket 28 shown in FIGS. 1, 2A, and 2B. The flats 36 on the head 31 of the ball stud 34 correspond to the fingers or tabs 42 that extend from the opening of the conventional socket 40. The tabs 42 have relief areas 43 interposed therebetween that are formed by legs 35 that extend to the substantially semi-hemispherical backing and cup portion 33 of the socket 40. The flats 36 on the head 31 can pass by the tabs 42 on the socket 40 and the rounded portions 38 of the head 31 can pass through the relief areas 43 in order to insert the head 31 into the socket 40. When the head 31 of the ball stud 34 is rotated such that the flats 36 on the head 31 are no longer oriented toward the tabs 43 extending from the opening of the socket 40 (FIG. 5), the rounded portion 38 of the head 31 engages the tabs 42. When the corresponding tabs 42 and round portions 38 are thus engaged (FIGS. 11 and 15), the head 31 of the ball stud 34 cannot be removed from the socket 40 without further rotation of the head 31 within the socket 40. As such, the head 31 remains free to pivot within the socket 40 but cannot be removed from the socket 40 without rotation.

In one embodiment, the head 31 of the ball stud 34 has a cylindrical protrusion 35 capped by a semi-hemispherical pivot pad 37. When inserted into the socket 40, the pivot pad 37 engages the semi-hemispherical cup portion 33 and effectuates the pivoting objective of the engagement between the socket 40 and the head 31 of the ball stud 34.

Ordinarily, the head 31 of the ball stud 34 used with adjusters need only pivot within the socket 40 about three and a half degrees in any direction. Thus, the pivot pad 37 and cup portion 33 engagement easily maintains sufficient pivotability. However, to allow additional flexibility of design, the socket 40, head 31, ball stud 34, pivot pad 37, and cup portion 33 are typically designed to allow pivoting of up to ten or fifteen degrees. The conventional socket 40 is typically screwed into the reflector of the headlamp assembly through hole 45.

Installing the head 31 of the ball stud 34 of the present invention into the corresponding socket 40 attached to the reflector is quite simple. As shown in FIG. 4, the shaft 44 of the adjuster is aligned with the socket 40 attached to the reflector such that the flats 36 on the head 31 are oriented toward the tabs 42 on the socket 40 and the rounded portions 38 of the head 31 are oriented toward the relief areas 43 and the head 31 is inserted into the socket 40. Then, the adjusting shaft 44 (and likely the entire adjuster) is rotated to engage the rounded portions 38 of the head 31 with the tabs 42 of the socket 40. Alternatively, the bead 31 of the ball stud 34 can be inserted into the socket 40 in a manner similar to how a conventional ball stud 22 is inserted into a socket 28, that is, by snapping the head 31 past the tabs 42 on the socket 40. After such engagement is accomplished, the shaft 44 can be moved by the adjuster in either direction substantially parallel with the shaft 44 to effectuate adjustment of the reflector by movement of the socket 40. If removal of the adjuster from the lamp assembly is desired, the ball stud 34 can be disengaged from the socket 40 by rotating the ball stud 34 such that the tabs 42 of the socket 40 no longer engage the round portions 38 of the ball stud 34 and the rounded portions 38 of the ball stud 34 are oriented toward the relief areas 43. The ball stud 34 can thus freely pass from the socket 40 because the flats 36 on the ball stud 34 can pass by the tabs 42 on the socket 40 and the rounded portions 38 can pass through the relief areas 43.

Installing the shaft 44 into the gear of the adjuster typically requires screwing the shaft 44 into the gear (see U.S. Pat. No. 5,707,133 incorporated herein by reference). As such, a means for grasping the ball stud 34 must be provided such that rotation of the shaft 44 can be easily accomplished. In the embodiment of the present invention shown in FIGS. 3, 4, 5, such grasping and rotation is accomplished by a square-shaped driving socket that engages the flat portions 36 on the head 31 of the ball stud 34. Rotation of the square-shaped driving socket thus accomplishes rotation of the head 31, ball stud 34, and shaft 44.

Figures 5, 6:
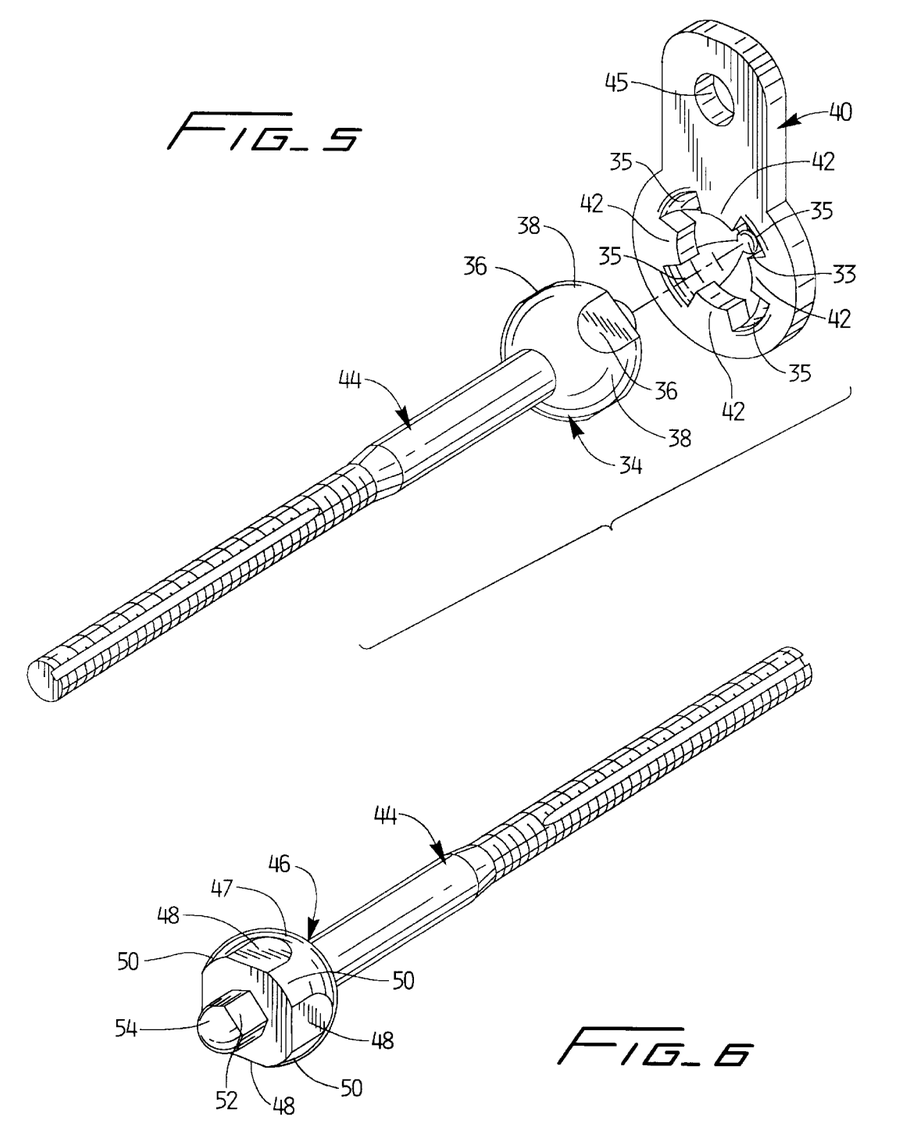
FIG. 5 is an exploded perspective view of the ball stud of FIG. 3 and the conventional socket of FIGS. 2 and 2A oriented such that if the ball stud were engaged in the socket it could not be removed without rotation of the ball stud.
FIG. 6 is a perspective view of a ball stud constructed in accordance with an additional embodiment of the present invention.

One alternative embodiment of the present invention is shown in FIG. 6. As with the embodiment shown in FIGS. 3, 4, and 5, the head 47 of the ball stud 46 has a number of flats 48 with rounded portions 50 interposed therebetween. The head 47 has a hexagonally-shaped protrusion 52 capped by a semi-hemispherical pivot pad 54. When inserted into the socket 40, the pivot pad 54 engages the semi-hemispherical cup portion 33 of the socket 40 and effectu-ates the pivoting objective of the ball stud 46 and socket 40 engagement. In this embodiment, the screwing of the shaft 44 into the gear of the adjuster may be accomplished either by rotation of a square-shaped driving socket 45 or by use of a hexagonal driving socket engaging the hexagonally-shaped protrusion 52.

Figures 7, 8, 9:
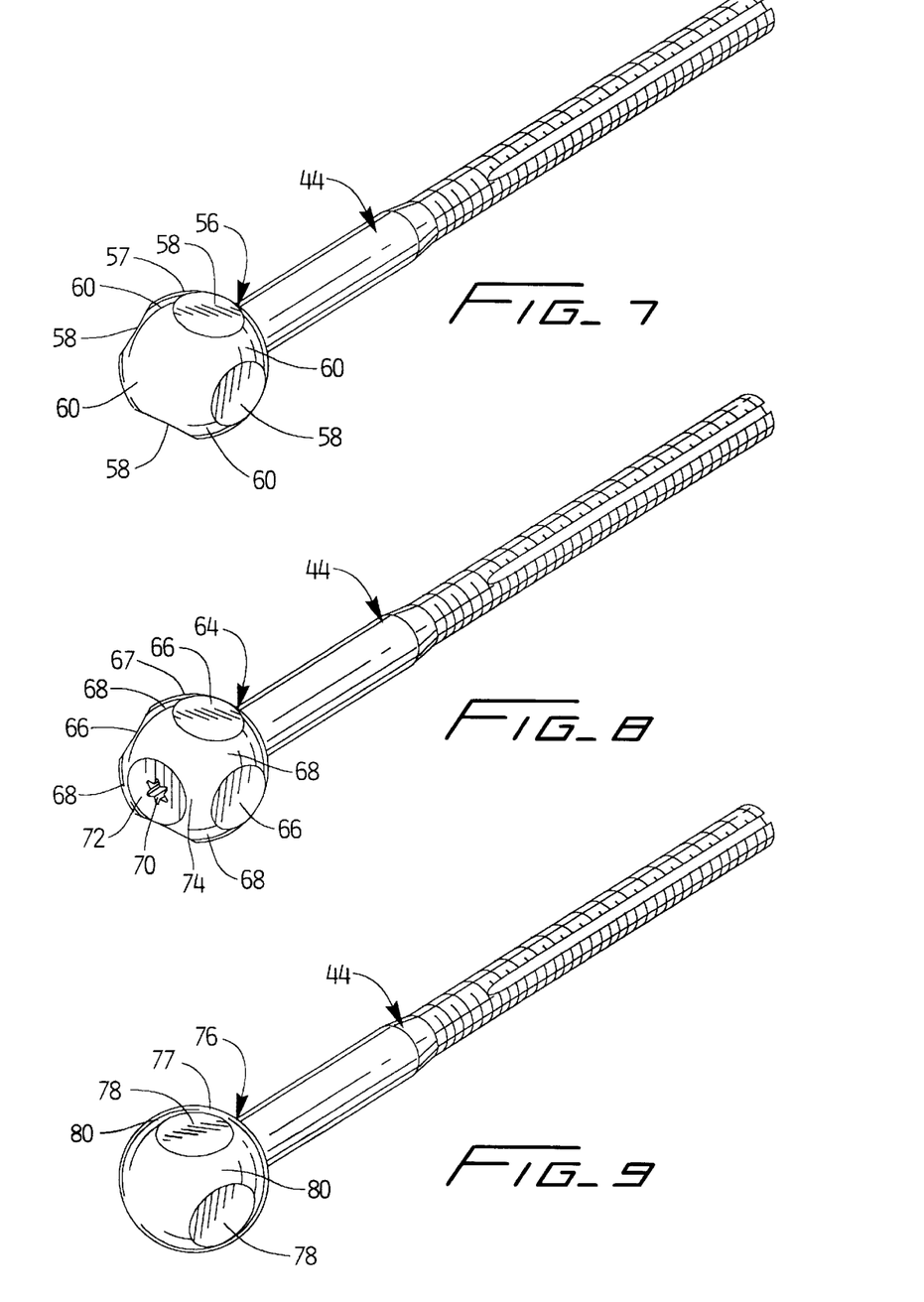
FIG. 7 is a perspective view of a ball stud constructed in accordance with a further embodiment of the present invention.
FIG. 8 is a perspective view of a ball stud constructed in accordance with an additional embodiment the present invention.
FIG. 9 is a perspective view of a ball stud constructed in accordance with another embodiment of the present invention.

Another alternative embodiment of the present invention is shown in FIG. 7. As with the previously described embodiments, the head 57 of the ball stud 56 has a number of flats 58 with rounded portions 60 interposed therebetween. The head 57 is capped by a semi-hemispherical pivot pad 62. When inserted into the socket 40, the pivot pad 62 engages the semi-hemispherical cup portion 33 of the socket 40 and effectuates the pivoting objective of the ball stud 56 and socket 40 engagement. In this embodiment, the screwing of the shaft 44 into the gear of the adjuster can be accomplished by rotation of a square-shaped driving socket 45.

An additional embodiment of the present invention is shown in FIG. 8. As with the previously described embodiment, the head of the ball stud 64 has a number of flats 66 with rounded portions 68 interposed therebetween. The head 67 has a small flattened end portion 70 with a Torx® or hexagonally-shaped driving receptacle 72 formed therein. The head 67 has a sufficiently rounded end portion 74 that when inserted into the socket 40, the rounded end portion 74 engages the semi-hemispherical cup portion 33 of the socket 40 and effectuates the pivoting objective of the ball stud 64 and socket 40 engagement. In this embodiment, the screwing of the shaft 44 into the gear of the adjuster may be accomplished either by rotation of a square-shaped driving socket 45 or by use of a hexagonal or Torx® driver engaging the driving receptacle 72.

Figures 10, 11:
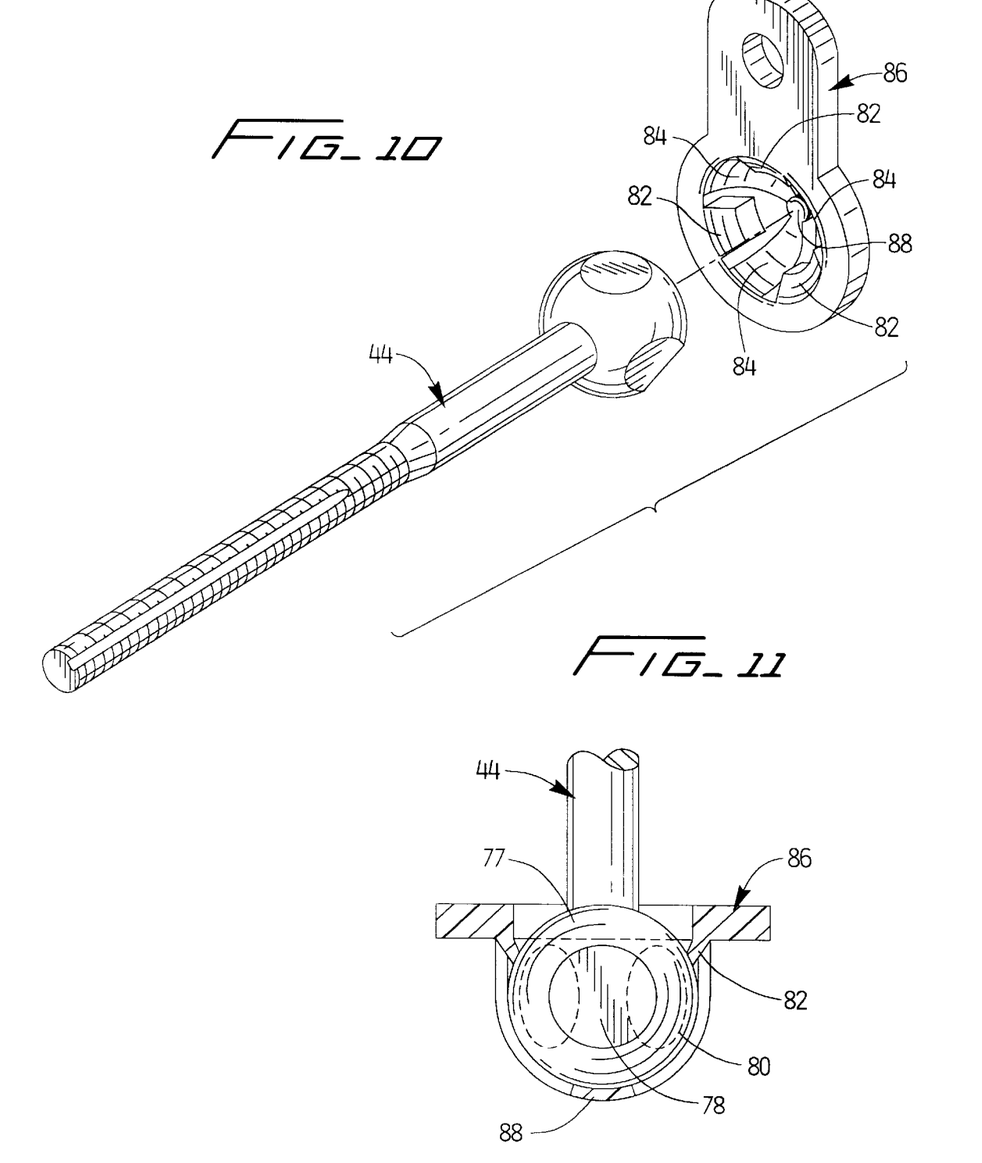
FIG. 10 is a perspective exploded view of a ball stud and socket constructed in accordance with still another embodiment of the present invention.
FIG. 11 is a partial cross-section of the ball stud of FIG. 10 engaged in a corresponding socket.

The further embodiment of the head 77 of a ball stud 76 in accordance with the present invention shown in FIGS. 9 and 10 has three flats 78 with three rounded portions 80 interposed therebetween that correspond to the three tabs 82 and three relief areas 84 interposed therebetween. The head 77 is inserted into the socket 86 as in the previously described embodiments. FIG. 11 is a cross-section of the ball stud 76 head 77 of FIGS. 9 and 10 engaged in the socket 86 such that it cannot be removed without additional rotation but remains free to pivot within the cup portion 88 of the socket 86. In this embodiment, the screwing of the shaft 44 into the gear of the adjuster may be accomplished by rotation of a substantially triangular-shaped driving socket that engages the flats 78. Other embodiments of the ball stud head may have two flat areas or even one flat area with a corresponding par of tabs or one tab on the socket. In such embodiments, the screwing of the shaft 44 into the gear of the adjuster may be accomplished using a correspondingly shaped driving socket.

Figure 12:
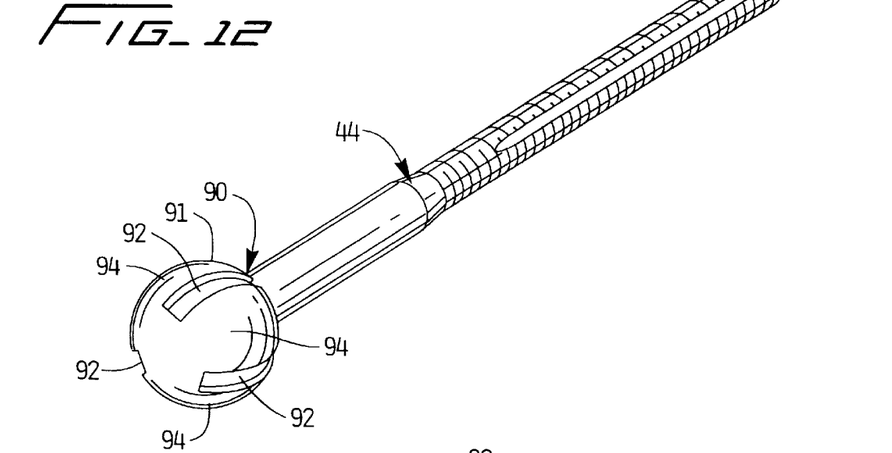
FIG. 12 is a perspective view of a ball stud constructed in accordance with an additional embodiment of the present invention.
Figure 13:
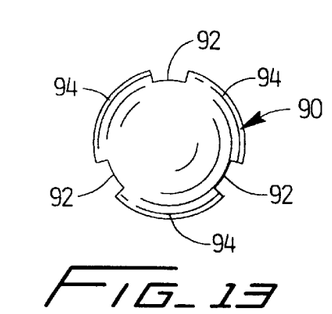
FIG. 13 is a top end of the ball stud of FIG. 12.

The embodiment of the head 91 of a ball stud 90 in accordance with the present invention shown in FIGS. 12 and 13 has grooves 92 instead of the flats used in the previously described embodiments. This embodiment also has rounded portions 94 as in the previous embodiments. The grooves 92 may be positioned such that the tabs 82 extending from the opening of the socket 86 (in this example, the one in FIG. 10) are freely passed and the head 91 can be removed from the socket. Of course, other numbers of grooves 92 and tabs 82 may be used.

Figure 14:
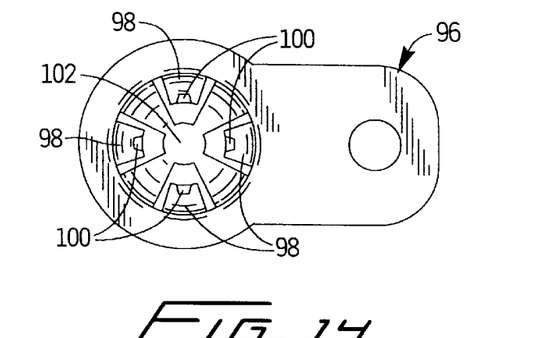
FIG. 14 is an end elevation view of an alternative embodiment of a socket for use in connection with a ball stud in accordance with the present invention.
Figures 15, 16:
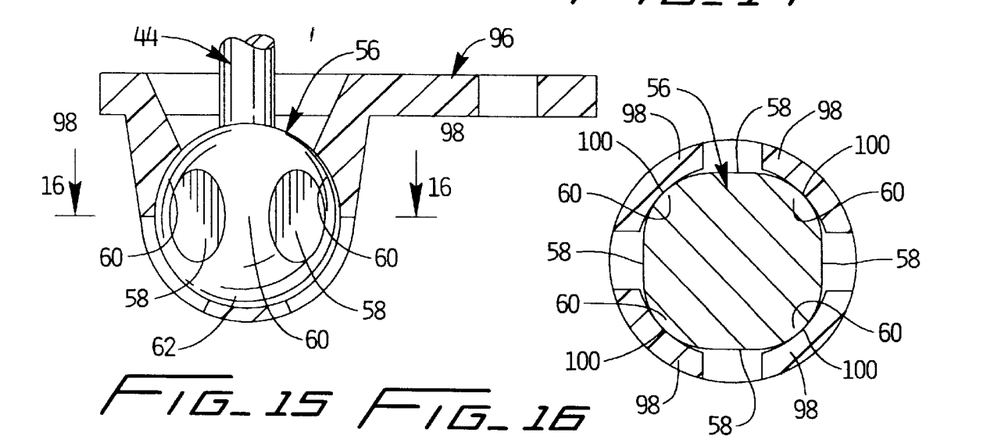
FIG. 15 is a partial cross-section of the ball stud of FIG. 7 shown engaged in the socket of FIG. 14.
FIG. 16 is a cross-section of the ball stud and socket combination of FIG. 15 taken generally along line 16—16.

FIGS. 14, 15, and 16, show an alternative embodiment of a socket 96 for use with a ball stud 56 in accordance with the present invention. In the example shown, the ball stud 56 and head 57 of FIG. 7 is shown but others may be used. In this embodiment of the socket 96, the tabs 98 extending from the opening of the socket 96 include biasing means in the form of detents 100 that tend to bias the head 57 in the retention position by enveloping the rounded portions 60 of the head 57. Biasing means other than the detents 100 shown in the Figures may be used to achieve the biasing objective. The pivot pad 62 pivots within the semi-hemispherical cup portion 102 of the socket 96. The head 57 may be removed from the socket 96 by rotating the head 57 such that the flat portions 58 are oriented toward the tabs 98. However, because of the detents 100, stronger rotational force is required to position the head 57 for removal than is required in conventional sockets. While the ball stud 56 and head 57 shown in FIGS. 14, 15, and 16 is the one shown in FIG. 7, similar tab 98 and detent 100 configurations may be used with the other embodiments of the ball stud.

Ball studs in accordance with the present invention may be made from a variety of materials depending on the particular application. The ball studs used in headlamp adjusters are typically are manufactured from metal or plastic, typically steel, zinc, brass, or nylon, when the adjuster is a standard adjuster (such as the one disclosed in U.S. Pat. No. 5,707,133) or from hard plastic or cast zinc when the adjuster is a motorized one. When the ball stud, head, and shaft are formed from metal, it may be manufactured by cold-heading, casting, or by other processes capable of forming the desired shape. When the ball stud, head, and shaft are formed from plastic, a molding process or other processes capable of forming the desired shape can be used to form the ball stud. Because of the various limitations and advantages of the various manufacturing processes, the ball stud 34 and head 31 shown in FIGS. 3, 4, and 5, can be manufactured by cold heading, casting, or molding; the ball stud 46 and head 47 shown in FIG. 6 can be manufactured by cold heading, casting, or molding; the ball stud 56 and head 57 in FIG. 7 can be manufactured by molding or casting; the ball stud 64 and head 67 shown in FIG. 8 can be manufactured by molding or casting; the ball stud 76 and head 77 shown in FIGS. 9 and 10 can be formed by molding or casting; and the ball stud 90 and head 91 shown in FIGS. 12 and 13 can be formed by molding or casting. Sockets used in connection with the ball stud of the present invention are typically formed by molding. Of course, the ball studs and sockets may be manufactured by other processes as is appropriate for the particular configuration.

An improved ball socket 140 is shown in FIGS. 18–22. The improved ball socket 140 can be effectively used with conventional ball studs (see FIG. 1) or disengageable ball studs (see FIGS. 3–16). The improved ball socket 140 is a one-piece design that includes the mounting screw 141 retained therewithin and extending through a mounting screw hole 145. This allows the mounting point of the socket 140 to be very close to the point where a ball stud is retained therein which results in reduced deflection of the part and more consistent aiming. As in the conventional socket 40, the improved socket 140 has tabs 142 that are capable of retaining a ball stud and that extend into the opening of the improved socket 140. The function of the tabs 142 is described above and while the tabs 142 work with a disengageable ball stud, the improved socket 140 may also be used with conventional ball studs. The improved socket 140 retains the mounting screw 141 therein by providing an undercut portion 144 and a chamber 147 which secures the head 143 of the mounting screw 141 after being snap-fitted into the socket 140. The diameter of the undercut portion 144 is smaller than the diameter of the head 143 of the mounting screw 141. Thus, the mounting screw 141 cannot be easily dislodged or separated from the socket 140 but is still allowed to rotate inside the chamber 147 because the chamber 147 is slightly larger than the head 143 of the mounting screw 141 and the combined unit can be easily handled on the assembly line and installed using automated equipment or more easily handled by hand. For installation to the headlamp assembly 180, the mounting screw 144 is rotatable within the socket 140. Alternative means for retaining the mounting screw 144 in the socket 140 could also be used, e.g., interference between the thread of the mounting screw 141 and the mounting screw hole 145, and interference between the head 143 of the mounting screw 141 and the inside of the socket 140.

The improved socket 140 further includes support legs 146 extending from a face plate 139 including flats 138 and a socket cup 148 at the end of the support legs 146. When a ball stud is inserted into the socket 140, the ball is pivotally secured within the socket 140 by the support legs 146, socket cup 148, and the tabs 142. The support legs 146 could be replaced with a contiguous body, but having separate support legs 146 is preferable to reduce weight and material costs. Also, while having four support legs 146 has been found to be an effective design, other numbers could be used. The improved socket 140 further includes leg extensions 150 to allow the socket 140 to non-rotatably mount on a generally square boss 152, such as that of headlamp assembly 180 shown in FIG. 23. This non-rotatable mounting is effectuated by the leg extensions 150 being placed on each side 156 of the square boss 152 when the mounting screw 141 is threaded into the mounting hole 154 in the square boss to secure the socket 140 to the boss. This non-rotatable mounting allows the socket 140 to be effectively used with the disengageable ball stud because it ensures the proper orientation of the tabs 142. Of course, other shaped bosses could be used with the appropriate modification of the leg extensions of the socket to match the particular shape characteristics of the boss.

Figure 23:
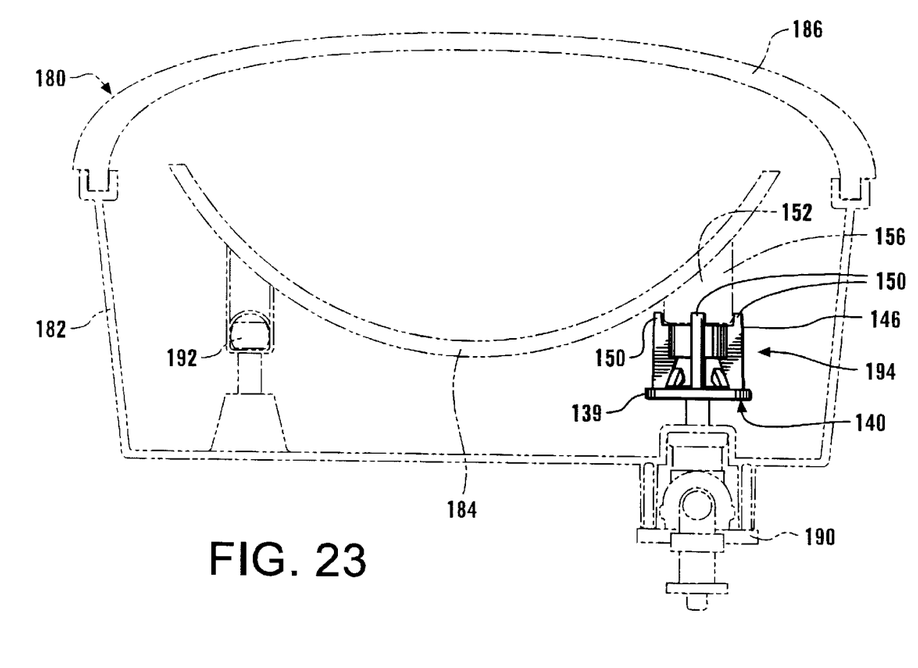
FIG. 23 is a partial cross-section of an automotive lamp assembly having a socket constructed in accordance with one embodiment of the improved socket invention installed to the reflector.

FIG. 23 shows an improved socket 140 installed in a lamp assembly 180 shown in phantom. The lamp assembly 180 includes a support frame 182, a reflector 184, a lens 186, a bulb (not shown), and one or more adjusters 190. The support frame 182 houses the reflector 184 and the bulb on a pivotable mounting to allow the aim of the lamp to be adjusted using the adjuster 190. The lens 186 seals the front of the assembly to protect it from the elements assailing the front end of the vehicle and provide an aerodynamic shape and attractive appearance. In such a lamp assembly 180, the reflector 184 mounts inside the housing one fixed ball joint 192 and is adjustable horizontally and vertically using adjusters 190 (only one shown in FIG. 23) that interface with the reflector 184 by moving ball joint 194. FIG. 23 shows the improved socket 140 secured to a square boss 152 extending from the reflector 184. The leg extensions 150 of the socket 140 interface with the sides 156 of the square boss 152 to non-rotatably engage the socket 140 with the boss 152.

Figure 25:
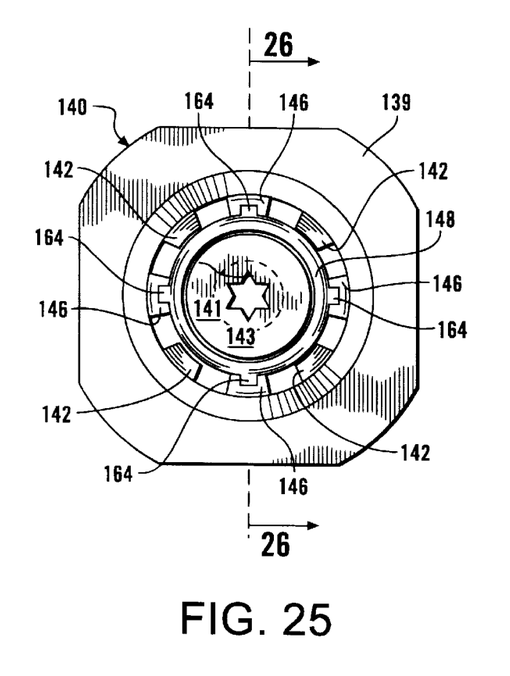
FIG. 25 is a top end view of one alternative embodiment of a socket constructed in accordance with the improved socket invention.
Figure 26:
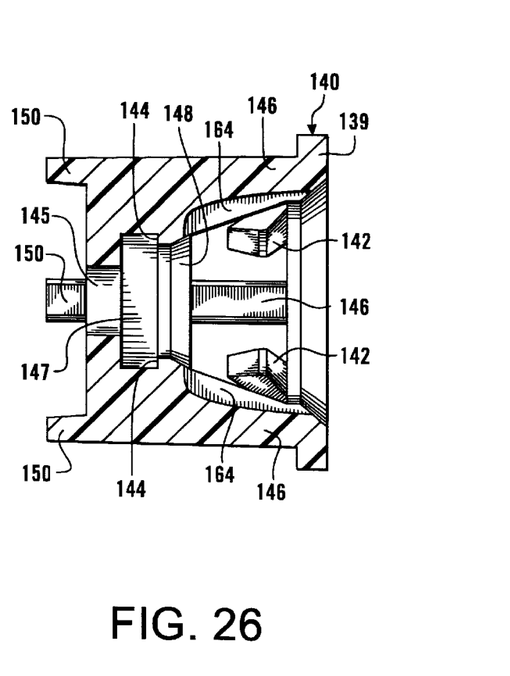
FIG. 26 is a cross-section of the socket in FIG. 25, taken generally along the line 26—26 in FIG. 25.

In an additional embodiment, shown in FIGS. 25 and 26, the improved socket 140 may be used with "eared" ball studs 160 to prevent rotation of the ball stud 160. FIGS. 24 and 24A show the ears 162 on an eared ball stud 162. In this embodiment, the improved socket 140 includes ear slots 164 in the support legs 146. When an eared ball stud 160 is fitted into the socket 140, the ears 162 slide into the ear slots 164 in the support legs 146. Because the ears 162 are engaged in the ear slots 164, the eared ball stud 160 cannot rotate with respect to the socket 140. As previously described, the leg extensions 150 are provided to allow the socket 140 to non-rotatably mount on a square boss 152. This non-rotatable mounting allows the socket 140 to be effectively used with a conventional eared ball stud 160 because it ensures proper orientation of the ear slots 164 and prevents rotation of the socket 140. In addition to being most effective with an eared ball stud 160, the improved socket 140 with ear slots 164 can also be used with a disengageable ball stud or a conventional ball stud. The ability to use the socket 140 with a wide variety of ball studs provides a significant benefit to headlamp assemblers because it allows the use of one style of socket with a number of types of ball stud.

The improved socket 140 is preferably manufactured using conventional injection molding technology. The mounting screw 141 can be manufactured using conventional methods. Prior to shipment to the headlamp assembler, each socket 140 is snap-fitted with a mounting screw 141 using automated or hand means. Of course, other process and methods could be used to manufacture pieces and assemble the assembly.

As illustrated by the foregoing description and shown in the Figures, the present invention is more suitable as a ball stud and corresponding socket in many applications than are conventional ball studs and sockets. The present invention overcomes the limitations and disadvantages of existing ball studs by utilizing an effective design whereby the head can be selectively removed from the corresponding socket as desired, is easily installed, and is cost effective. The improved socket design can be effectively used with a wide variety of ball studs, including the disengageable one described herein. Of course, the ball stud and corresponding socket of the present invention has many other applications aside from use in a lamp assembly.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. A ball socket for use with a ball stud, the socket comprising:
   a face plate having an opening for receiving the ball stud;
   a plurality of support legs extending from the face plate to form a socket cup for receiving the ball stud;
   a mounting screw retaining means disposed within the socket, the retaining means comprising a chamber formed by an undercut in the socket cup, the undercut having a diameter; and
   a mounting screw having a head and a threaded end, the mounting screw retained within the socket by the mounting screw retaining means such that the head of the mounting screw is retained within the chamber by the undercut, the mounting screw extending from the socket.

2. The ball socket of claim 1 wherein the head of the mounting screw has a diameter and when the diameter of the undercut is smaller than the diameter of the head of the mounting screw.

3. The ball socket of claim 2 wherein the mounting screw has a head and a threaded portion, the head retained within the chamber and the threaded portion extending from the socket.

4. The ball socket of claim 1 further comprising a plurality of leg extensions extending therefrom.

5. The ball socket of claim 1 further comprising at least one tab extending inwardly into the opening in the face plate.

6. A ball socket comprising:
   a face plate having a ball stud receiving opening;
   a socket body having a socket cup with an undercut portion defining a chamber; and
   a mounting screw having a head rotatably disposed within the chamber of the socket, the head of the mounting screw having a diameter larger than the undercut portion of the socket cup such that the head of the mounting screw is retained within the chamber by the undercut portion.

7. The ball socket of claim 6 wherein the mounting screw further includes a threaded portion extending from the socket.

8. The ball socket of claim 7 further comprising a plurality of leg extensions extending therefrom.

9. The ball socket of claim 8 further comprising at least one tab extending inwardly into the opening in the face plate.

10. A ball socket for pivotally connecting a ball stud to a boss extending from a reflector in a headlamp assembly the ball socket comprising:
    a socket body having a ball stud receiving opening and a socket cup, the socket cup having an undercut portion defining a chamber within the socket body; and
    a mounting screw having a head disposed within the ball socket and a threaded end extending from the ball socket, the head of the mounting screw rotatably disposed within the chamber and secured therein by the undercut portion, the threaded end of the mounting screw extending into the boss.

11. The ball socket of claim 10 wherein the socket body has a plurality of leg extensions extending therefrom, the leg extensions capable of co-acting with a generally square shaped boss to prevent rotation of the socket.

12. The ball socket of claim 11 wherein the mounting screw further includes a threaded portion, the threaded portion extending from the socket body such that the ball socket can be threadingly secured to a boss.

13. The ball socket of claim 12 further comprising at least one tab extending inwardly into the ball stud receiving opening.

14. A headlamp assembly comprising:
    a reflector having a boss extending therefrom
    a ball socket mounted to the boss by a threaded portion of a mounting screw having a head, the ball socket having a ball stud receiving opening, a socket cup, and a chamber formed by an undercut, the head of the mounting screw disposed within the chamber and retained therein by the undercut; and
    a headlamp adjuster having a ball stud extending therefrom, the ball stud engageable in the ball socket.

15. The headlamp assembly of claim 14 wherein the boss is generally square shaped and wherein the ball socket has a plurality of leg extensions extending therefrom, the leg extensions coacting with the generally square boss to prevent rotation of the socket.

16. The headlamp assembly of claim 15 wherein the mounting screw further includes a threaded portion, the threaded portion extending from the ball socket to threadingly secure the ball socket to the boss.

17. The headlamp assembly of claim 16 further comprising at least one tab extending inwardly into the ball stud receiving opening, the at least one tab capable of interfacing with the ball stud so that the ball stud is selectively disengageable from the ball socket.

18. A ball socket for use with a ball stud and a mounting screw, the socket comprising:
- a face plate having an opening for receiving the ball stud;
- a plurality of support legs extending from the face plate to form a socket cup for receiving the ball stud; and
- a mounting screw retaining means disposed within the socket, the retaining means comprising a chamber formed by an undercut in the socket cup such that a head of the mounting screw is retainable in the chamber by the undercut.

19. The ball socket of claim 18 wherein the undercut in the socket has a diameter, the diameter of the undercut being smaller than the diameter of the head of the mounting screw.

20. The ball socket of claim 18 further comprising a plurality of leg extensions extending therefrom.

* * * * *